United States Patent [19]

Campbell

[11] Patent Number: 4,822,134

[45] Date of Patent: Apr. 18, 1989

[54] OPTICAL FIBER CABLE MARKER

[75] Inventor: Bruce D. Campbell, Portola Valley, Calif.

[73] Assignee: Raychem Corp., Menlo Park, Calif.

[21] Appl. No.: 918,746

[22] Filed: Oct. 14, 1986

[51] Int. Cl.$^4$ .......................... G02B 6/44; B65H 59/00
[52] U.S. Cl. .......................... 350/96.23; 254/134.3 FT
[58] Field of Search ..................... 350/96.23; 356/73.1; 254/134.3 FT

[56] References Cited

U.S. PATENT DOCUMENTS

| | | | |
|---|---|---|---|
| 4,508,317 | 4/1986 | Conti | 254/134.3 FT |
| 4,555,175 | 11/1985 | Gardner et al. | 356/32 |
| 4,582,297 | 4/1986 | Conti | 254/134.3 FT |

Primary Examiner—Stanley D. Miller
Assistant Examiner—Richard Roseen
Attorney, Agent, or Firm—Dennis E. Kovach; Herbert G. Burkard

[57] ABSTRACT

An optical fiber cable construction includes a first fiber marker which allows one initially to determine a linear length of the optical fiber between first and second points, and a second marker which allows one to determine a linear length of the fiber optical cable between the first and second points, thus ensuring that the length of the fiber initially exceeds the length of the cable during initial installation so as to minimize the chances of excessive temperature induced stress being imposed on the optical fiber during its useful life.

12 Claims, 2 Drawing Sheets

U.S. Patent    Apr. 18, 1989    Sheet 1 of 2    4,822,134
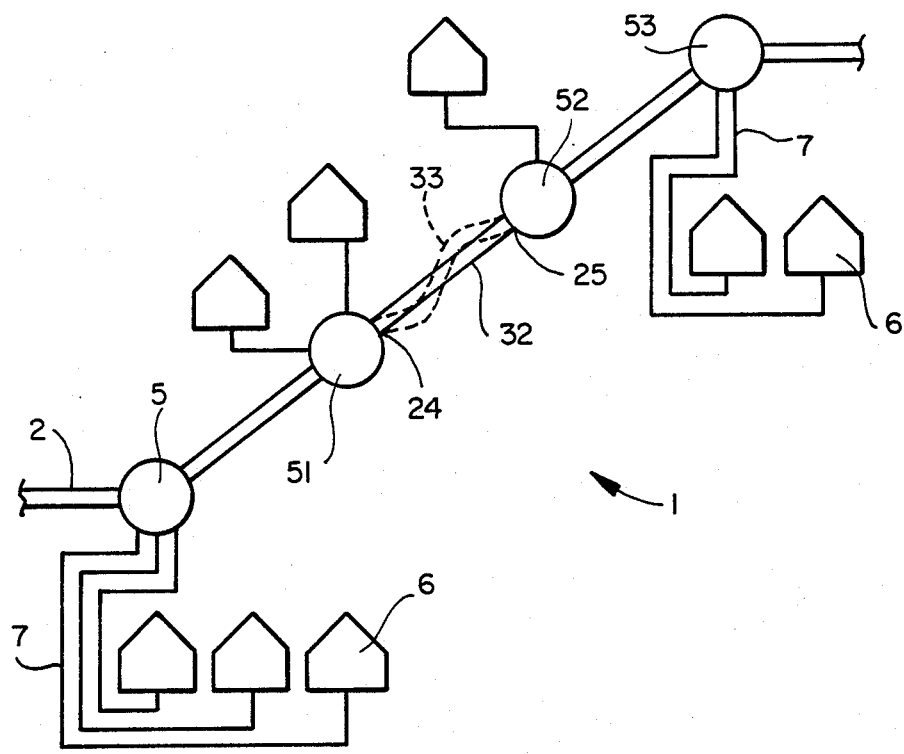
FIG_1
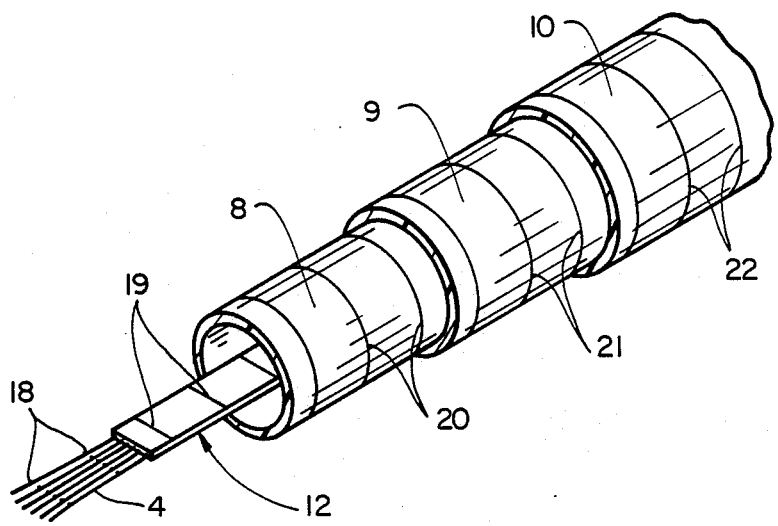
FIG_2

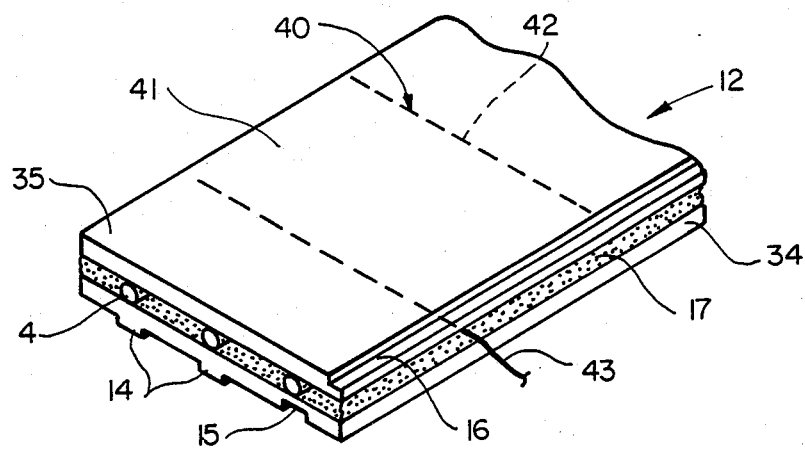
FIG_3
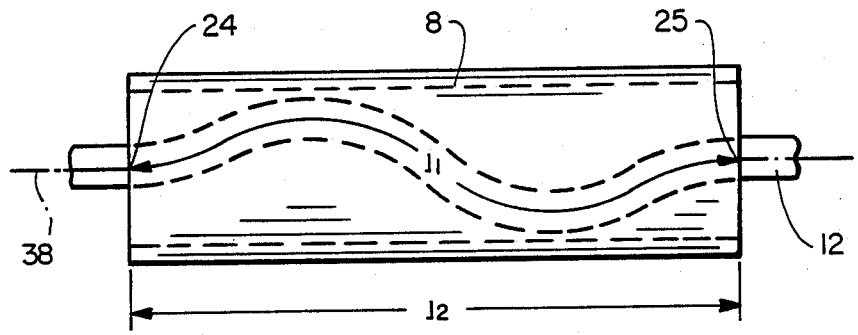
FIG_4
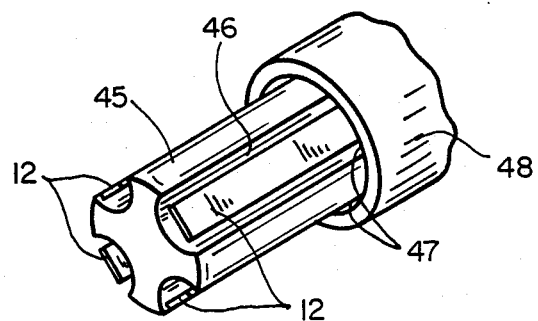
FIG_5

OPTICAL FIBER CABLE MARKER

CROSS-REFERENCE TO RELATED APPLICATIONS

The present invention is related to U.S. applications Ser. No. 754,035 filed July 11, 1985, Ser. No. 602,242 filed Apr. 19, 1984, and an application entitled "Enclosure for Telecommunication Line" filed by James E. Jervis on Aug. 22, 1986, all assigned to the assignee of the invention, the disclosures of which are all incorporated herein by reference. The invention is also related to concurrently filed U.S. patent application entitled "Optical Fiber Cable Including Gel" also assigned to the assignee of the invention, this latter application including claims directed to an improved cable construction shown in FIG. 3 which includes a gel, the present application claiming a cable construction which includes a fiber marking system.

BACKGROUND OF THE PRESENT INVENTION

The present invention relates to an optical fiber architecture whereby an optical fiber is sequentially attached at a plurality of points in some manner. Specifically, the present invention is an improved optical fiber cable construction most suitable for a multi-user distribution architecture and topology, improved methods for installing an optical fiber cable for a multi-user optical fiber distribution architecture and topology, and also methods of preventing or minimizing the chance that optical fibers used in such architectures and topologies will be subjected to excess stresses and strains which can cause premature fiber failure.

SUMMARY OF THE INVENTION

An object of the present invention is to provide an improved method for installing an optical fiber as well as an improved optical fiber cable construction, the invention being most suitable for optical fiber topologies whereby an optical fiber is loosely contained within the cable.

According to the invention, the cable construction includes first and second marking means for determining a linear length of an optical fiber extending between first and second fixed points and for determining a linear length of the optical fiber cable extending between the first and second points. Accordingly, by appropriately noting values of the first and second markers, one can determine the linear length of the optical fiber and the optical fiber cable extending between the first and second points and if necessary linearly move the optical fiber relative to the optical fiber cable so as to change the length of the optical fiber between the first and second points while keeping the cable length constant so as to prevent the optical fiber being subjected to excessive strain in the event the optical fiber cable length changes due to environmental factors, such as temperature increases.

BRIEF DESCRIPTION OF THE DRAWINGS

FIG. 1 is a schematic illustration of an optical fiber distribution architecture topology;

FIG. 2 is a perspective view of one preferred embodiment of an optical fiber cable construction of the invention;

FIG. 3 is a perspective view of one embodiment of a portion of the optical fiber cable illustrated in FIG. 2;

FIG. 4 is a further detailed view of a portion of the cable illustrated in FIGS. 1 and 2; and FIG. 5 is a perspective view of an alternative cable construction usable with the invention.

DESCRIPTION OF THE PREFERRED EMBODIMENTS

FIG. 1 illustrates a general layout of an optical fiber distribution architecture topology 1 of the invention whereby an optical fiber cable 2 is disposed over a desired geographical path, with optical fibers 4 (FIG. 2) within the cable 2 being sequentially tapped at locations 5, 51, 52, 53, etc. The optical fibers can comprise single mode or multimode fibers, either step or graded index, and preferably comprise a glass core and cladding with a polymeric buffer or coating being disposted around the glass, though the invention is suitable for plastic clad fibers as well. An outside diameter of the coating is preferably less than 1000 μm, preferably less than 500 μm, more preferably less than 300 μm, e.g. optimally about 250 μm.

The particular distribution architecture utilized is not essential according to the present invention, such architectures including a ring, star, or bus, and combinations thereof. Regardless of the architecture utilized, the topology implementing the architecture basically comprises an optical fiber cable geographically arranged outdoors between the plurality of locations 5, 51, 52, 53 whereat access to the fibers is achieved so that reading information being propagated by the fibers can be achieved and/or writing or injecting information into the fibers can also be achieved, as desired, preferred uses of the network being for telephone and television networks. Though the locations 5, 51, 52, 53 etc. could correspond to locations whereat the ultimate users are situated, such as houses, offices or factories, the invention also is usable with topologies whereby additional communication lines 7 extend from the locations 5, 51, 52, 53 to end users 6 somewhat remote from these locations, the communication lines 7 either being optical or electrical, as desired, with any line 7 serving any desired number of users.

A preferred optical tap of the invention at the locations 5, 51, 52, 53 includes structure which bends the optical fiber about a minimum radius of curvature sufficient to create an acceptably large cone of acceptance for light injection through a side of the fiber and/or is capable of withdrawing light from the fiber core and cladding through the fiber buffer for detection, either at the bend or close thereto at a fiber straight section.

A preferred optical fiber cable 2 usable in ring, star, and/or bus architectures is illustrated in FIG. 2, the cable of the invention including a plurality of optical fibers 4, preferably but not necessarily supported or carried by means 12 such as a tape 12, the fibers 4 and the tape 12 being disposed loosely within a hollow tube 8 such that the tape and fibers are free to move longitudinally within the tube 8 and hence can define a somewhat curved path as illustrated in FIG. 4 relative to a path of a longitudinal axis 38 of the tube 8. The tube 8 has an internal diameter larger than the fibers 4 and/or the tape 12, the internal diameter generally being less than 300 mm, 200 mm, 100 mm, 50 mm, and 25 mm, e.g. larger than 5 mm, e.g. about 10–20 mm, the size being governed to a large extent to the number of fibers being used and a shape of the carrier means 12 therefor.

The tube 8 is preferably surrounded by further layers 9, 10, the number of such layers being subject to performance design criteria. According to a preferred embodiment of the invention, at least one of the further layers 9, 10 comprises a metal shield layer which, for buried applications, is advantageous since it provides an excellent moisture vapor barrier and affords the cable significant mechanical strength and hence protection from being severed by rodents, ploughs, or similar types of hazards to which buried ground cables are subject, with at least one polymeric layer preferably being disposed over and around the metal layer.

A preferred embodiment of the tape 12 is illustrated in FIG. 3 wherein first and second tape members 34, 35 are illustrated as being disposed on opposite circumferential sides of a plurality of optical fibers 4 so as to maintain the fibers 4 between the members 34, 35, with optionally a pressure sensitive material 17 being disposed on either one or both surfaces of the members 34, 35 in contact with the fibers to help maintain them in place. Alternatively only one of the members 34, 35 is necessary if the material 17 has sufficient adhesive strength to keep the fibers in place.

According to a preferred embodiment, the pressure sensitive material 17 can comprise an adhesive or a gel, preferably tacky. A preferred gel is one comprising a three-dimensional network and being any of the types as described in U.S. Pat. No. 4,600,261 and copending U.S. patent application Ser. Nos. 504,000 filed June 13, 1983, 507,433 filed June 23, 1983, and 646,555 filed Aug. 31, 1984, all of which are assigned to the assignee of the invention, the disclosures of which are all incorporated herein by reference.

Specifically, the gel has a cone penetration value from approximately 80 to 350 ($10^{-1}$ mm) preferably between 200 and 300 ($10^{-1}$ mm), most preferably between 240 and 280 ($10^{-1}$ mm), an ultimate elongation of at least approximately 50%, preferably greater than 80%, 120%, 200%, or 500%, and a cohesive strength greater than an adhesive strength of an exposed surface of the gel to itself, a similar gel, or the fibers. In addition, the gel 17 preferably has an adhesive strength to one of the tape members 34 greater than an adhesive strength to the fibers 4 so that the fibers can be cleanly and easily removed from the carrier means 12 when the cable is entered at an intermediate point thereof. The stated parameters for the cone penetration and elongation are provided in accordance with the American National Standard Designation ASTM D217 and ASTM D738, respectively. A viscous flow of the gel is such that it tends to conform around an outer surface of an object surpressed therein, specifically an optical fiber, and exerting pressure on the gel increases the degree in quality with which the gel conforms to the optical fiber. The gel preferably has an exposed surface which is tacky, as indicated, and which is also hydrolytically stable, the gel preferably being moisture insensitive and substantially inert towards materials forming the tape and an outer surface of the optical fibers, e.g. their buffers or coatings. Such gels can be formed from urethan, silicone, or butyl rubber compositions, as described in the applications and patents referenced.

When two tape members 34, 35 are utilized, it is preferred to provide means 40 for removing a portion 41 of one of the tape members 35 easily to facilitate reentry, such means preferably including means for weakening traverse lines of the member 35, such as by spaced perforations 42, or by forming a tear string 43 within the member 35 which can be pulled to tear a line along the member 35. Preferably the means 40 is periodically and repetitively formed on the carrier means 12 so that easy access to the fibers 4 is possible regardless of any random intermediate section of the cable to be entered for the purpose of gaining access to the fibers 4 such that the fibers can be terminated or preferably tapped through a continuous side thereof by passing the light through the fiber buffer or coating, preferably at a bend.

An advantage of using a supporting means 12 for the fibers 4 is that the means 12 allows an easy and convenient way to order and identify respective ones of the optical fibers 4 since the optical fibers 4 can be placed longitudinally along the means 12 in a parallel fashion. Accordingly, assuming one side edge of the means 12 is keyed such as for example by a groove 16 to identify a location of any particular optical fiber, in this case the rightmost oriented fiber as viewed in FIG. 3, then other ones of the fibers can be positively identified by their geometrical relationship with respect to this identified fiber. Alternatively, projections or protrusions 14, 15 on a surface of the means 12 can likewise be used to identify one or more of the optical fibers. An additional advantage of the supporting or carrying means 12 is that additional moisture sealing is provided thereby as well as some additional mechanical protection.

According to the construction shown in FIG. 3, the means 12 comprises first and second tape members 34, 35, with the material 17 being disposed therebetween and the fibers being embedded therewithin, this construction being only one of a variety of carrier constructions usable with the present invention. It should also be recognized that the invention includes embodiments wherein the means 12 is not provided and the fibers 4 are simply loosely disposed within the tube 8, preferably with some manner of identifying respective ones of the fibers 4 without using remote light sources, one such method being the provision of periodic markings on an outer surface of the fiber coating which are color coded, for example.

According to the invention, the fibers 4 and/or the carrying means 12 are marked by first markers 18, 19 so as to provide means for determining incremental lengths along the fibers 4 within the tube 8, it being appreciated that only the markings 18 or 19 are required, though both can be provided for redundancy if desired. In addition, at least one or more of the tube 8, and additional layers 9, 10 are provided with second markers 20, 21, 22, it being realized only one of the second markers 20, 21, or 22 is required, though additional markers can be utilized if redundancy is to be incorporated into the design. The second markers 20–22, like the first markers 18, 19, provide a method of determining incremental lengths of the cable, and specifically the tube 8. Accordingly, referring to FIG. 4, it can be appreciated that by comparing the value of the markers 18, 19 with the value of the markers 20–22 at a downstream point 24 and an upstream point 25, one can readily determine a linear length 11 of the optical fibers 4 or carrying means 12 within a linear length 12 of the tube 8 between the points 24, 25. In addition, since the fibers 4 or carrying means 12 are loosely disposed within the tube 8, the incremental length means or the markers 18, 19 and 20, 21, 22 can be utilized so as to change the length $l_1$ so as to make it any desired percentage larger than the length $l_2$ while keeping $l_2$ constant by simply keeping the fibers 4 or carrying means 12 fixed at one of the points 24, 25 relative to the tube 8 and by sliding the fibers 4 or carrying means 12 relative to the tube in a longitudinal direction at the other one of the points 24, 25.

The desirability and advantages of the markers 18, 19 and 20–22 of the cable construction of the invention will be more fully appreciated by referring back to FIG. 1 wherein the downstream and upstream points 24, 25 coincide with locations 51, 52. For distribution topologies of the present invention, it is expedient and convenient to simply lay the cable 2 over a desired geographical path, and then later go back and attach individual ones of the optical fibers 4 within the cable 2 at the locations 5, 51, 52, 53 to optical fiber taps capable of reading or writing, as desired.

According to a preferred embodiment of the invention, the optical fibers 4 are not cut and terminated at at least some of the locations 5, 51, 52, 53, with light being injected or withdrawn from the fibers through sides thereof such that the fibers are continuous in length through at least some of the locations 5, 51, 52, 53. Accordingly, assuming the location 5 is downhill of the locations 51, 52 and 53, after laying the cable 2 from the location 5, any excess length of optical fiber 4 or carrier means 12 within the loose tube 8, e.g. the extent to which $1_1$ is greater than $1_2$, will tend to descend downward towards the location J due to gravitational forces and hence be predominantly if not exclusively located entirely between the locations 5, 51. Hence, a length $1_1$ of the optical fibers 4 between the points 24, 25 coincides exactly or nearly exactly coincides with the length $1_2$ of the tube 8 between the points 24, 25.

Accordingly, if individual ones of the optical fibers 4 are fixedly attached at the locations 24 and 25 to taps capable of reading and/or writing, as desired, thereafter problems will occur due to expansions and contractions of materials induced by environmental factors, such as temperature variations. Specifically, assuming the optical fiber cable 2 is initially laid so as to have the path between the points 24, 25 indicated by the solid line 32, thereafter if the temperature were to rise and the cable 2 includes some type of strength member such as a metal shield, the overall length $1_2$ of the cable between the points 24, 25 will increase due to thermal expansion of the metal shield such that the cable will take on a path configuration having a somewhat longer length, schematically illustrated by the dotted line 33. However, since the optical fibers 4 have a much lower coefficient of thermal expansion than most all materials, and specifically metals and polymers, it will be appreciated that the optical fibers 4 will be placed under significant tension and ultimately will fracture if the expanded path configuration 33 requires that the fibers 4 traverse a linear path of length significantly longer than their original length $1_1$.

Therefore, according to the invention, prior to fixedly attaching any continuous lengths of the optical fibers 4 to any kind of structure at any of the locations 5, 51, 52, 53, a craftsman determines a value of the markers 18 or 19 and 20 or 21 or 22 at a prior downstream location of the fibers and the next upstream location, and then adjusts the length $1_1$ between the adjacent locations using the markers so as to provide that $1_1$ is a desired percentage greater than the length $1_2$, a desired percentage increase being between 2 and 15%, preferably between 4 and 9%, e.g. about 5%. Thereafter, at the upstream point 25 the continuous lengths of fibers are then fixed in place.

By following these procedures, it will be appreciated that sufficient slack will exist between a length of the fibers 4 and a length of the loose tube 8 or cable 2 such that changes in a linear length of the tube 8 or cable 2 will not detrimentally place the optical fibers 4 under tension and hence will not result in the fibers 4 fracturing thereby.

Finally, though the invention has been described by reference to a particular loose tube cable design, the invention is usable with other cable designs as well, one such additional design being illustrated in FIG. 5. In this figure, the cable includes a solid core 45 having recesses 46 therearound which form hollow bores 47 when surrounded by additional protective layers 48, fibers 4 and/or carrying means 12 being disposed within the bores 47. The bores can extend straight down the cable or helically wind around the cable core 2, as desired.

Accordingly, the invention provides an improved optical fiber cable along with methods of installing an optical fiber cable so as to minimize or prevent the optical fibers therewithin from fracturing due to changes induced by environmental conditions, the invention including all reasonable equivalents thereof, and being limited only by the appended claims.

We claim:

1. A method of installing an optical fiber cable having at least one optical fiber loosely contained within the cable, comprising the steps of:

disposing the optical fiber cable over a geographical area so as to extend past first and second points, the optical fiber being loosely contained within the cable and being capable of moving linearly relative to the cable;

noting a first value of a fiber length marker indicative of a linear length of the optical fiber between first and second points;

noting a second value of a cable length marker indicative of a linear length of the optical fiber cable between the first and second points;

comparing the first and second values to determine if the first value is at least a predetermined percent larger than the second value; and fixing the optical fiber in place at the first and second points when the first value is at least the predetermined percent larger than the second value.

2. The method of claim 1, further comprising the step of moving the optical fiber linearly relative to the optical fiber cable at at least one of the first and second points so as to change the first value and so as to insure that the first value is at least the predetermined percent larger than the second value.

3. The method of claim 2, further comprising the step of fixing the optical fiber in place at the first and second points such that the optical fiber is continuous in length through the first and second points so as to continuously extend to third and fourth points remote from and on opposite sides of the first and second points.

4. The method of claim 3, the optical fiber being bent at the first and second points about a minimum radius of curvature sufficient to couple light therein or thereout.

5. The method of claim 1, the first and second points being at an elevation higher than an elevation of the cable on at least one side of the first and second points.

6. An optical fiber cable construction, comprising:
an optical fiber;
first means for determining a linear length along the optical fiber;
an optical fiber cable, the optical fiber being loosely disposed within the cable such that relative linear movement between the fiber and the cable is possible; and second means for determining a linear length along the cable.

7. The cable construction of claim 6, the first and second determining means allowing a length of the optical fiber and the cable, respectively, between first and second points to be measured, the cable being constructed such that the length of the fiber between the first and second points can be varied while keeping the length of the cable between the first and second points constant.

8. The cable construction of claim 7, the cable including a hollow cavity within which the optical fiber is loosely contained.

9. The cable construction of claim 7, the cavity including a hollow tube within which the optical fiber is loosely contained.

10. The cable construction of claim 9, further comprising means for carrying the optical fiber within the tube, the carrying means including a tape for supporting a plurality of optical fibers, and further including means for identifying individual ones of the optical fibers.

11. The cable construction of claim 8, further comprising a metal shield layer surrounding the cavity.

12. An optical fiber network, comprising:
an optical fiber cable;
at least one optical fiber loosely disposed within the cable such that relative linear movement between the fiber and the cable is possible;
first and second means for fixing first and second portions of the optical fiber at first and second points remote from one another;
first and second markers for determining a linear length of the optical fiber and the cable, respectively, between the first and second points;
the cable and fiber being constructed such that the linear length of the fiber between the first and second points can be varied while maintaining the linear length of the cable constant between the first and second points.

* * * * *